United States Patent Office 3,574,710
Patented Apr. 13, 1971

3,574,710
CARBAMATES CONTAINING NF₂ GROUPS
James E. Coleman, Edison, Lawrence J. Engel, Dunellen, and Ferdinand Cataneo, Cranford, N.J., assignors to Esso Research and Engineering Company
No Drawing. Filed June 3, 1963, Ser. No. 286,108
Int. Cl. C07c *125/04*
U.S. Cl. 260—482      16 Claims The present invention relates to new high-energy oxidizers produced by reaction of tris(difluoramino)methyl isocyanate with alcohols or organic compounds having a hydroxyl group, preferably alcohols containing oxidizing groups such as —NF₂, —NO₂, and the like. Resulting oxidizer products formed by this reaction have very low volatility and are mostly solids. Among these products are oxidizers which are sought after for their high ratio of oxidizer groups to their carbon constituents with adequate stability to make them useful as components of solid rocket propellants meeting high specific impulses above 270.

The reactant, tris(difluoramino)methyl isocyanate, has the compositional formula $(NF_2)_3CNCO$. It can be made by reacting the compound known as perfluoroguanidine $(NF_2)C=NF$, with cyanic acid, HNCO, preferably in the presence of a catalyst and an inert organic solvent at low temperatures to form the adduct, $(NF_2)_2CNFHNCO$, then fluorinating this adduct with fluorine. A suitable catalyst for making the adduct is urea at temperatures of about —20° C. using about a slight excess mole ratio of the perfluoroguanidine to the cyanic acid and a contact period of about 10 to 30 minutes. The resulting adduct can be fluorinated with about 1 to 2 moles F₂ per mole of the adduct either in an inert organic solvent such as acetonitrile or a perhalohydrocarbon at a low temperature, e.g., —20° C.

The tris(NF₂)methyl isocyanate reacts satisfactorily with a number of primary and secondary alcohols to form compounds in which the tris(NF₂)methyl group, $(NF_2)_3C$—, is linked through a carbamate ester linkage, —NHCOO—, to the portion of the alcohol molecule which carried the hydroxyl group. Thus, the types of compounds which are obtained can be represented as having the following general formula:

$$[(NF_2)_3CNHCOOR']_n$$

where R' represents the substituted hydrocarbon portion or moiety of an alcohol having energetic oxidizing groups as substituents, and n is 1 to 2, for monohydric and dihydric alcohols, respectively. The alcohol reactant may be a diol or polyol compound which contains the oxidizing group substituents and may be reacted with enough of the tris(NF₂)methyl isocyanate to obtain a linkage to replace each of the OH groups by tris(NF₂)methyl carbamate groups, $(NF_2)_3CNHCOO$—. In the R' moiety, usually of 1 to 6 carbon atoms, there are preferably 1 to 2 oxidizing groups as substituents per 1 to 2 carbon atoms.

The preparation and characterization of a number of oxidizer products of the present invention formed will be illustrated in the following examples.

EXAMPLE 1

Trinitroethyl-N-tris(difluoramino)methyl carbamate $$(NF_2)_3CNHCOOCH_2C(NO_2)_3$$

Reaction of 0.27 g. of tris(difluoramino)methyl isocyanate with 0.23 g. of trinitroethanol, $HOCH_2C(NO_2)_3$ in acetonitrile gave a white solid. The infrared spectrum indicated the product was a mixture of the desired carbamate and unreacted trinitroethanol. Analysis gave the following results.

*Analysis.*—Calculated for 67% $C_4H_3N_7F_6O_8$+33% $C_2H_3N_3O_7$ (percent): F, 23.8; C, 12.5; N, 24.7. Found (percent): F, 23.8; C, 12.51; N, 23.80.

Investigation of this white solid product indicated that it was a mixture of specified carbamate and unreacted trinitroethanol. The unreacted trinitroethanol can be separated for further reaction or the proportions of the reactants may be changed to react more of the trinitroethylol. The synthesis reaction is:

$(NF_2)_3CNCO + HOCH_2C(NO_2)_3 \longrightarrow$

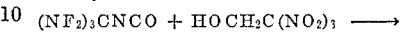
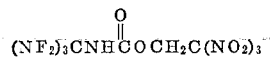

A simple water washing of the mixed product yielded a solid of 26.8% F compared to 29% F for the highly energetic carbamate showing that there is no problem in purification of this product which contains six oxidizer groups (three NF₂ plus three NO₂) per four carbon atoms.

A number of energy evaluations made on this high-energy oxidizer showed that it could be used in realistic proportions with boron powder and a polymer binder of 68% NF₂ content to form a propellant having an Isp. of 283 to 286. Sixty-six percent of the carbamate with 3.6% boron powder and 30% of the binder, percent by weight, makes a composite having an Isp. of 285.9.

EXAMPLE 2

2,2 - bis(difluoramino)propyl-1,3-bis[-N,N'-tris(difluoramino)methyl carbamate]

$$(NF_2)_3CNHCOOCH_2C(NF_2)_2CH_2OOCNHC(NF_2)_3$$

The reaction of 0.4 g. of tris(difluoramino)methyl isocyanate with 0.17 g. of 1,3-dihydroxy-2,1-bis(difluoramino) propane in acetonitrile yielded 0.39 g. of a white solid, M.P. 92° to 94° C. The infrared spectrum indicated that the product is a carbamate.

Analysis gave 52.9% F, 22.97% N, and 14.23% C (calculated for $C_7H_6N_{10}F_{16}O_4$ (percent): 50.8 F, 14.05 C, and 23.4 N). The synthesis reactions is represented by:

$(NF_2)_3CNCO + HOCH_2C(NF_2)_2CH_2OH \longrightarrow$

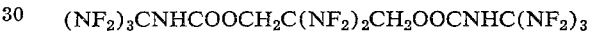

With IR, the N.M.R. and chemical analysis indicated the composition and structure set forth for the product. This product was found to have a relatively low impact sensitivity and satisfactory thermal stability. Considering that this product contains eight NF₂ groups and seven carbon atoms, it is remarkably stable. Energy evaluations show that this mixed oxidizer in a composite with a solid oxygen oxidizer such as nitronium perchlorate and boron powder and with 30% of NF₂ containing polymer binder makes a propellant composite having an Isp. in the range of 284 to 293.

EXAMPLE 3

Difluoraminomethyl-N-tris(difluoramino)methyl carbamate-$(NF_2)_3CNHCOOCH_2NF_2$ The reaction of 0.37 g. of tris(NF₂)methyl isocyanate with 0.14 g. of difluoramino methanol in acetonitrile gave 0.36 g. of a clear, water-white, high-boiling liquid. The product was identified and characterized as the product made in accordance with the equation:

$(NF_2)_3CNCO + NF_2CH_2OH \longrightarrow$ 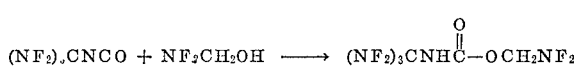

The vapor pressure of this liquid was found to be less than 1 mm. at 25° C. This liquid was found to have tendencies to be shock sensitive, however, it is possible to use a desensitizing material with it and thus it may be used as a plasticizer or may have other uses as a detonating agent or in explosives.

In general, the esterification reactions set forth are carried out at ambient temperatures in the range of about 20° to 30° C. under atmospheric pressure, and in the presence of an inert organic liquid diluent. The temperature can be varied, and by raising the temperature the reaction can be increased.

The successful reactions of the compound tris($NF_2$) methyl isocyanate with the alcohols having oxidizing groups as substituents to form more highly energic carbamates than have been hitherto obtained was surprising. This isocyanate behaves in an odd manner. It is converted to an amine by reaction with water and the resulting amine failed to react with the isocyanate or an alkyl isocyanate. However, the formation of the highly energetic carbamates that could be isolated and found to be thermally stable was accomplished.

Other examples of energetic $NF_2$- and $NO_2$-containing alcohols and their products of reaction with tris($NF_2$) methyl isocyanate are listed as follows:

The invention described is claimed as follows:

1. A carbamate of an energetic alcohol containing oxidizing groups of the class consisting of —$NF_2$ and —$NO_2$ as substituents of a hydrocarbon moiety in the alcohol and a tris($NF_2$)methyl radical linked through a carbamate ester linkage to said hydrocarbon moiety of the alcohol in substitution for a hydroxyl function of the alcohol.

2. A carbamate as defined in claim 1 wherein a second tris($NF_2$)methyl radical is joined by a carbamate linkage in substitution of a second hydroxyl function of the alcohol.

3. A carbamate having the formula:

$$[(NF_2)_3CNHCOOR']_n$$

wherein R' represents a substituted hydrocarbon moiety of an energetic alcohol containing —$NF_2$ group substituents, said alcohol having 1 to 6 carbon atoms and 1 to 2 $NF_2$ groups per one to two carbon atoms, and $n$ being 1 and 2 for monohydric and dihydric alcohols respectively.

| $NF_2$- and $NO_2$-alcohols | Product |
|---|---|
| $NF_2NF_2$<br>\|   \|<br>$HOCHCHOH$<br>1,2-bis(difluoramino)-1,2-dihydroxyethane | $(NF_2)_3NHCOOCH(NF_2)CH(NF_2)OOCHNH(NF_2)_3$ 1,2-bis(difluoramino) ethyl 1,2-bis[N,N'-tris(difluoramino) methyl carbamate] |
| $NF_2$<br>\|<br>$(NF_2)CH_2CH \cdot CH_2OH$<br>2,3-bis(difluoramino)propanol | <br>$(NF_2)CH_2CH(NF_2)CH_2O\overset{O}{\underset{\|}{C}}N\overset{H}{\underset{/}{C}}(NF_2)_3$<br>2,3-bis(difluoramino)propyl-N-tris(difluoramino)methyl carbamate |
| $OH$<br>\|<br>$(NF_2)CH_2CH(NF_2)CHCH(NF_2)CH_2(NF_2)$<br>1,2,4,5-tetrakis(difluoramino)pentanol-3 | $O=C-NC(NF_2)_3$<br>\|<br>$O$<br>\|<br>$NF_2CH_2CH(NF_2)CCH(NF_2)CH_2NF_2$ 2[1,2,4,5-tetrakis(difluoramino)pentyl]-N-tris(difluoramino)methyl carbamate |
| $(NF_2)CH_2[CH(NF_2)]_3CH_2OH$<br>2,3,4,5-tetrakis(difluoramino)pentanol | $(NF_2)CH_2[CH(NF_2)_2]_3CHO\overset{O}{\underset{\|}{C}}N\overset{H}{\underset{/}{C}}(NF_2)_3$<br>2,3,4,5-tetrakis(difluoramino)pentyl-N-tris(difluoramino)methyl carbamate |
| $OH \quad OH$<br>\|   \|<br>$(NF_2)CH_2CH(NF_2)CHCHCH(NF_2)CH_2(NF_2)$<br>1,2,5,6-tetrakis(difluoramino)hexan diol-3,4 | $[(NF_2)CH_2CH(NF_2)\overset{H}{\underset{\|}{C}}O\overset{O}{\underset{\|}{C}}N\overset{H}{\underset{/}{C}}(NF_2)_3]_2$<br>3,4-[1,2,5,6-tetrakis(difluoramino]-bis-[N,N'-tris(difluoramino) methyl carbamate] |
| $HOCH_2C(NO_2)_2CH_2OH$<br>2,2-dinitro-1,3-dihydroxypropane | $(NF_2)_3N\overset{H}{\underset{\|}{C}}\overset{O}{\underset{\|}{}}OCH_2C(NO_2)_2CH_2O\overset{O}{\underset{\|}{C}}N\overset{H}{\underset{/}{}}(NF_2)_3$<br>1,3-[2,2-dinitropropyl]-bis-[N,N'-tris(difluoramino)methylcarbamate] |
| $NO_2CH_2CH(NO_2)CH_2OH$<br>2,3-dinitropropaaol | $NO_2CH_2CH(NO_2)CH_2O\overset{O}{\underset{\|}{C}}NHC(NF_2)_3$<br>2,3-dinitropropyl-N-tris(difluoramine)methyl carbamate |

In the preparation of high-energy polymers containing $NF_2$ groups with terminal hydroxyl groups, the tris($NF_2$) methyl isocyanate may be used as a chain extender or capping agent modifier. For example, it may be reacted with the diol or polyol of poly[4,5-bis(difluoramino) pentadiene monoxide] to form the N-tris($NF_2$)methyl carbamate modified polymer and it may be reacted with the diol or polyol of poly [1,2,5,6-tetrakis(difluoramino) hexene-1-oxide] to form the N-tris($NF_2$)methyl carbamate modified polymer.

It will be noted that the tris($NF_2$)methyl carbamate modified energetic alcohol products of outstanding value are those which contain from about 1 to 2 oxidizing groups (—$NF_2$ and —$NO_2$) per carbon atom in the molecule. In general, the preferred compounds are saturated aliphatic carbamates containing 1 to 2 carbamate functions and the oxidizing group substituents in the chain are derived from the alcohol and attached to the tris($NF_2$)methyl moiety. The number of carbons contributed by the alcohol in forming the carbamate may be in the range of 1 to about 6 and with 1 to about 6 oxidizing group substituents.

4. Trinitroethyl-N-tris(difluoramino)methyl carbamate having the formula:

$$(NF_2)_3NHCOOCH_2C(NO_2)_3$$

5. 2,2 - bis(difluoramino)propyl-1,3 - bis[-N,N'-tri(difluoramino)methyl carbamate] having the formula:

$$(NF_2)_3CNHCOOCH_2C(NF_2)_2CH_2OOCNHC(NF_2)_3$$

6. Difluoraminomethyl - N - tris(difluoramino)methyl carbamate having the formula:

$$(NF_2)_3CNHCOOCH_2NF_2$$

7. 1,2 - bis(difluoramino)ethyl-1,2-bis[N,N'-tris(difluoramino)methyl carbamate] having the formula:

$$(NF_2)_3NHCOOCH(NF_2)CH(NF_2)OOCHNH(NF_2)_3$$

8. 2,3 - dinitropropyl-N-tris(difluoramino)methyl carbamate having the formula:

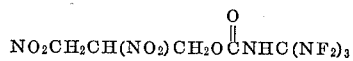

9. The process for preparing a carbamate of an energetic alcohol containing oxidizing groups consisting of NF₂ and NO₂ as substituents which comprises reacting tris(NF₂)methyl isocyanate with the energetic alcohol to form the carbamate and recovering the resulting carbamate.

10. The method of preparing a carbamate having the formula:

$$[CNF_2)_3CNHCOOR']_n$$

wherein R' is a substituted hydrocarbon moiety of an energetic alcohol having 1 to 6 carbon atoms and 1 to 2 oxidizing groups of the class consisting of NF₂ and NO₂ as substituents per 1 to 2 carbon atoms of R', $n$ being 1 to 2 for monohydric and dihydric respectively, which comprises reacting the energetic alcohol with tris(difluoramino)methyl isocyanate to replace hydroxyl groups of the alcohol by carbamate linkage with a tris(difluoramino)methyl radical, and recovering the resulting carbamate product.

11. The method as set forth in claim 10 wherein reaction of the alcohol with the tri(difluoramino)methyl isocyanate is carried out under ordinary temperature conditions in the presence of an inert diluent.

12. The method of preparing trinitroethyl-N-tris(difluoramino)methyl carbamate which comprises reacting trinitroethanol with tris(difluoramino)methyl isocyanate to form a white solid carbamate product, and recovering said product.

13. The method of preparing 2,2 - bis(difluoramino) propyl - 1,3 - bis[N,N' - tris(difluoramino)methyl carbamate] which comprises reacting 1,3-dihydroxy-2,2-bis (difluoramino)propane with tris(difluoramino)methyl isocyanate to form a white solid product, and recovering said product.

14. The method of preparing difluoraminomethyl-N-tris(difluoramino)methyl carbamate which comprises reacting difluoramino methanol with tris(difluoramino) methyl isocyanate to form a high-boiling liquid carbamate, and recovering said carbamate.

15. The method of preparing 1,2-bis(difluoramino) ethyl - 1,2-bis[N,N'-tris(difluoramino)methyl carbamate] which comprises reacting 1,2-bis(difluoramino)-1,2-dihydroxy ethane with tris(difluoramino)methyl carbamate to form the carbamate product in which the hydroxyl groups are replaced by tris(difluoramino)methyl carbamate linkages, and recovering said carbamate.

16. The method of preparing 2,3-dinitropropyl-N-tris (difluoramino)methyl carbamate which comprises reacting 2,3 - dinitropropanol with tris(difluoramino)methyl carbamate, and recovering said carbamate.

References Cited

Hoffman et al. Chem. Reviews, vol. 62, pp. 12 to 18 (1962).

LELAND A. SEBASTIAN, Primary Examiner

U.S. Cl. X.R.

149—19, 109; 260—453